United States Patent [19]

Le Feron de Longcamp

[11] Patent Number: 4,858,297
[45] Date of Patent: Aug. 22, 1989

[54] MANUFACTURING METHOD FOR A NON-INFLATABLE DEFORMABLE WHEEL

[76] Inventor: Guy Le Feron de Longcamp, 9 Zue Massenet, 75016 Paris, France

[21] Appl. No.: 104,790

[22] Filed: Oct. 5, 1987

[51] Int. Cl.$^4$ .............................................. B21D 53/26
[52] U.S. Cl. ..................................... 29/159 R; 301/55
[58] Field of Search ........................ 29/159 R, 159.01; 152/5, 6, 11, 12, 14; 301/55

[56] References Cited

U.S. PATENT DOCUMENTS 2,404,974  7/1946  Martin ...................................... 152/6
4,241,775 12/1980  Jackson ................................ 152/548

FOREIGN PATENT DOCUMENTS 190968  8/1986  European Pat. Off. ................ 152/5

*Primary Examiner*—P. W. Echols
*Attorney, Agent, or Firm*—Howard C. Miskin

[57] ABSTRACT

A noninflatable wheel is manufactured by fabricating a subassembly including a radially deformable tread of constant peripheral length and formed of a pair of inner and outer superimposed bands joined by cementing or vulcanization, the inner band advantageously consisting of side-by-side plates mutually hinged by imbedment in rubber, and cable loops having outer bands anchored to the inner bands and extending radially inwardly to inner ends. The subassembly is assembled to a concentric hub having peripherally rigidly formed peripherally spaced hooks which are nonresiliently directly connected to the cable looped inner ends. The hub may include a pair of relatively rotatable discs having the hooks peripherally located thereon and being mutually alternating, the relative angular adjustment of the discs controlling the cable tension.

10 Claims, 1 Drawing Sheet

MANUFACTURING METHOD FOR A NON-INFLATABLE DEFORMABLE WHEEL

The present invention relates to a manufacturing process for a non-inflatable deformable wheel of the type comprising a rigid hub, a radially deformable tread whose peripheral length is substantially constant, and means connecting the hub to the band constituted of at least one cable, the process including the manufacturing of a sub-group comprising the connecting means and the tread, and the assembling of the sub-group to the hub.

A wheel of the above mentioned type is described in my copending application Ser. No. 825,327 filed Mar. 24, 1986 now abandoned.

The aforesaid copending application does not describe definitely a manufacturing process, it appears from the description of the examples, that those are achieved with techniques close to those which are used for manufacturing tires, that is, by setting on the one hand the tread, on the other hand the sidewalls for example by imbedded them into rubber which is then cured. The sidewalls, as those of tires, include beads having a constant peripheral length, intended to cooperate with a groove in the hub to form the complete wheel assembly.

The aforesaid process requires intricate installations, in particular internal supporting toolings which have the capacity to have an outside diameter which is equal to the inner diameter of the tread and which can then be reduced to become smaller than the beads, in order to permit its extraction.

Those installations are designed for wheel sizes and characteristics which are specified, they fit with another wheel with difficulty, so that the manufacturing procedure described in this patent is not well fitted for wheels manufactured in small mass productions.

The present invention intends to provide an improved method of producing a wheel of the above indicated type, which has a low production cost and which can nevertheless be fitted to wheels having different characteristics, particularly as are concerned with the pressure on the ground, its maximum value, the gripping on the ground and so on...

This result and others are achieved according to the invention, by providing a manufacturing procedure which includes the following steps:

(a) manufacturing a structural part constituted of cable, that is one or more cables constituting the connecting means and of the radially flexible band intended to be a part of the tread;

(b) manufacturing an outside band, intended to be a part of the tread, this outside band being radially flexible and comprising an outside surface designed for contact with the ground, the said flexible band and/or the said outside band having a peripheral length which is substantially constant;

(c) assembling the structural part to the outside band in order to form the tread;

(d) assembling the hub to the cable or cables, expedited by hooking means located on the hub.

This procedure provides a first advantage, the suppression of the bead and consequently the complexity due to the extraction of an internal supporting tooling.

As a preferential method the structural part is assembled to the outside band by sticking and/or vulcanization, with tightening between the two concentric and approximately cylindrical surfaces.

As an advantageous mode of execution, the structural part is manufactured in an approximately cylindrical shape.

As an other mode of execution, the structural part and/or the outside band are/is manufactured as a plane shaped element, the ends of which are then linked together. This last mode requires a less complex installation but the linkage of the band ends requires a particular attention. One may note that the same installation can be used for the manufacturing of the band having various lengths, so for wheels having various diameters, this is an advantage for small production quantities. The assembling with tightening of the cylindrical surfaces may be used to reduce the tensions occurring with the shape variation from a plane to a cylinder.

As a practical realization, the flexible band is manufactured as a succession of bars parallel to the wheel axis, the cable or the cables being set around the ends of each of them or of a part of them, the bars being linked one to by being imbedded in rubber.

As a first mode of realization of means connecting the cables to the hub, those means are constituted of a succession of axial protrusions or projections, preferably of hook shape, regularly spaced on the periphery of the hub, and around which the cables will be hooked, usefully in the shape of loops or buckles.

As an another mode of realization of means connecting the cables to the hub, those are constituted by at least one peripheral groove in the hub, and in which the cables will be fitted.

These two modes are not equivalent: the first one allows the setting of the cables in a more uniform manner in the same surface of a sidewall, the second one is simpler and gives less fatigue to the cables when they are highly stressed, because of the tangential fit to the hub.

In other respects, the first mode of realization allows a particularly simple way for the construction of a wheel having a changeable stiffness. Indeed it is enough to fix the protrusions, placed on the same side, alternately on two stands such as two discs having the same axis and the capacity to turn one relative to the other one. A relative rotation of those stands changes the angle of the cables with the periphery of the hub, and consequently the radial size of the sidewalls of the unloaded wheel.

The invention will now be described in greater detail with the help of practical examples, illustrated in drawings among which:

Figure 1:
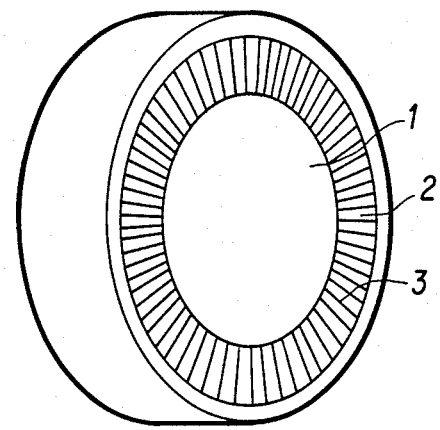
FIG. 1 is a perspective view of the assembled complete wheel.
Figure 2:
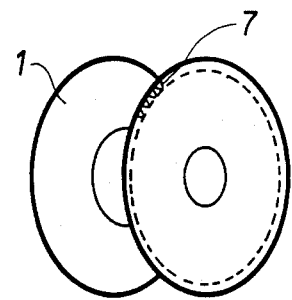
FIGS. 2, 3 and 4 are perspective views of the hub, the structural part and the outside band respectively.

FIG. 1 shows the assembled wheel with the hub 1, the outside band 2, and the cables 3 constituting the connecting means between the hub and the tread.

Figure 3:
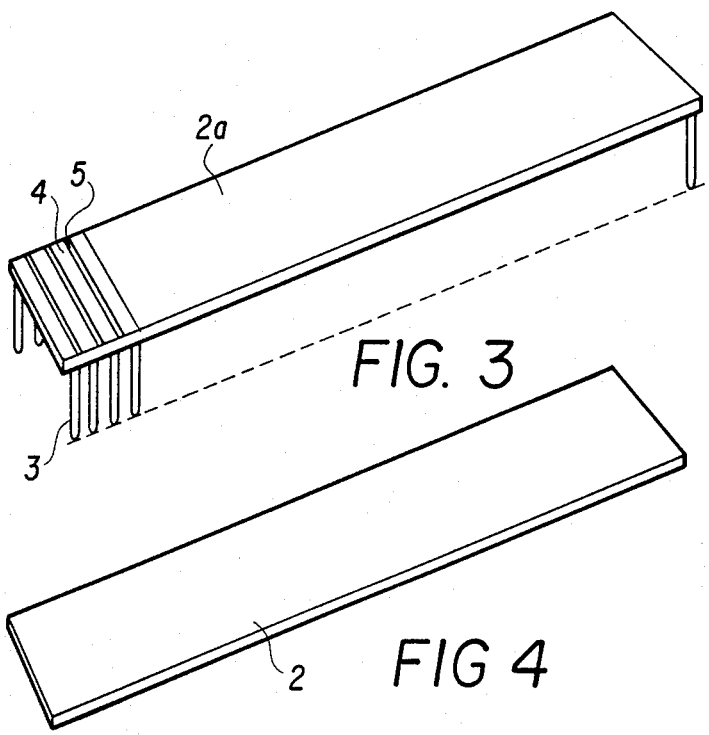
Figure 4:
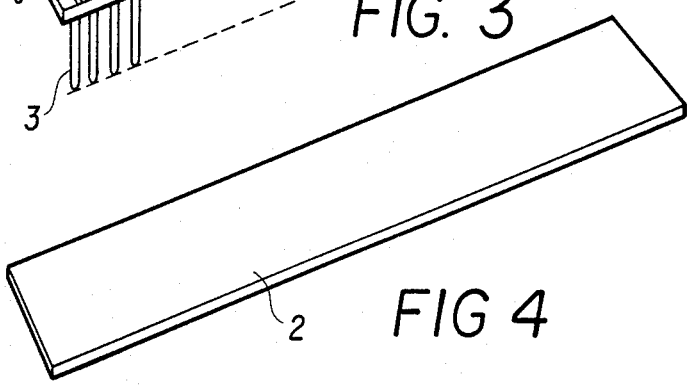

In the described example the outside band and the structural part are initially flat, as indicated in FIGS. 3 and 4, then they are ring shaped by joining the two ends. This procedure allows a high simplification of manufacturing but it requires a particular attention to the junction at the ends. The tread and structural part may be made of elongated bands which are cut off in lengths according to the size of the desired wheel.

However it is possible to manufacture the outside band and structural part directly in a ring shape, this eliminates the junction problem at the cost of a bit more complex manufacturing.

Figure 5:
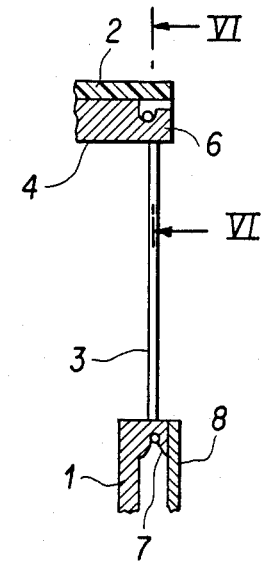
FIG. 5 is a fragmental axial of the wheel.
Figure 6:
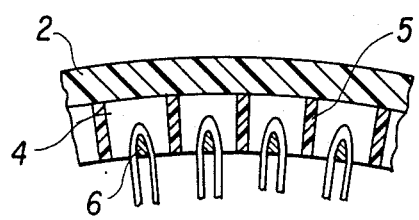
FIG. 6 is a radial section taken along lines V1—V1 of FIG. 5.

As can be seen in FIGS. 5 and 6, in the particular example the structural part is constituted of a succession of metal bars 4 disposed parallel to each other in the axial direction and bound one to the other by rubber masses 5 which provide relative flexibility. The bars 4 and the rubber masses 5 constitute together a flexible inside band 2a which is stuck to and internally lines the outside band 2 in order to constitute with it the tread of the wheel.

The bars 4 end with sort of hooks 6 outwardly radially directed which engage the cable 3. On the edge of the hub 1 are formed a succession of similar hooks 7 but which are radially inwardly directed and completes the fastening of the cable 3. A disc 8 fitted on the hub, prevents the cable from disengaging the hooks 7 in the case of excessive proximity of the tread to the hub. The edges of the hook 7 are sloped to allow an easy setting in of the cable.

The outside band 2 is constituted of a rubber layer, in which may be incorporated a textile reinforcement which is not represented.

The manufacture of a wheel comprises fabrication of the structural part by a high temperature bonding between the bars 4 and the rubbers masses 5, the cables being previously set in the hooks 6. In the process, the cables 3 are locked to the bars by the rubber.

It should be noted that there may be employed cable loops or buckles of the same number as the hooks 6, or a single cable running alternately on the hooks 6 and on the hooks 7.

The two ends of the structural part are then brought together, which can be done by linking together two half-bars 4, and then the outside band 2 is assembled on it, the ends of the outside band 2 may be linked before or after the assemblage.

Afterwards, the cable is set on the hooks 7 and is locked on them by the disc 8 whereby the cable is nonresiliently directly coupled to said hub.

Figure 7:
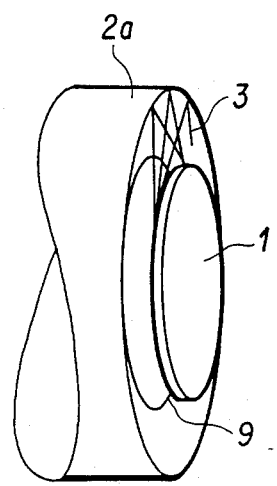
FIG. 7 is a fragmented perspective view showing another mode of realization of the invention.

FIG. 7 schematically illustrates another mode of realization of the invention. The multiple hooks 7 shown in FIG. 5 are omitted and the hub 1 is shaped in order to provide a peripheral groove 9.

Each of the buckles of cable 3 which can be seen in FIG. 3 has a sufficient length to pass round the hub in the groove 9, this length being in other respects calculated to allow the working of the wheel with the required performances. In the FIG. 7 for an easier understanding only two complete buckles are shown. In order to avoid the relative rotation of the hub and the buckles of cables, those are fixed in position after being set in, by being embodied in a mass of rubber for instance. One may note the extreme simplicity of the hub shape and of the cables setting.

A regulation of the cable tension is possible by an axial movement of the groove 9.

What is claimed is:

1. A method for manufacturing a non-inflatable deformable wheel of the type comprising a rigid hub, a radially deformable tread of substantially constant peripheral length, and cable directly connecting said hub to said tread, said method comprising the steps of:
   (a) fabricating a structural part constituted essentially of: (1) said cable and (2) a radially flexible inside band for a part of the tread, said cable being assembled to said flexible band;
   (b) separately fabricating a one-piece outside band for another part of the tread;
   (c) assembling said structural part with said outside band to form a subassembly; and
   (d) coupling said cable nonresiliently directly to said hub.

2. A method according to claim 1, wherein said outside band is assembled with said structural part by sticking, said flexible band and said outside band together between the confronting concentric cylindrical surfaces of said bands.

3. A method according to claim 1, wherein said structural part is fabricated in an approximately cylindrical shape.

4. A method according to claim 1, wherein said structural part is manufactured as a flat shaped element, whose opposite ends are thereafter linked together.

5. A method according to claim 1, wherein said outside band is manufactured as a flat shaped element, whose opposite ends are thereafter linked together.

6. A method according to claim 1, wherein said flexible band is fabricated to form a succession of bars parallel to the wheel axis, the cable being set around the ends of at least a part of said bars, and said bars being linked to each other by imbedment in rubber.

7. A method according to claim 1, wherein said cable or cables are fastened on a succession of hooking means forming part of said rigid hub and distributed on the hub periphery.

8. A method according to claim 1 wherein, in the step (d), the cable engages the hub in a circular groove in said hub.

9. The method of producing a noninflatable deformable wheel including a hub, a radially deformable, constant peripheral length tread surrounding the hub and coupling means including cable connecting said hub and tread comprising the steps of:
   fabricating a first peripheral band including a plurality of peripherally successive bars parallel to the wheel axis and linked to each other by imbedment in rubber and coupling cable extending inwardly from said band and having outer ends anchored to the outer parts of at least some of said bars;
   fabricating a second band encircling and overlying the first band and defining therewith a radially deformable tread of substantially constant length and forming with said cable coupling and first band a subassembly unit;
   fabricating a hub with peripherally spaced coupling means; and
   assembling said hub with said subassembly unit with the inner ends of said coupling cable being anchored to said hub coupling means.

10. The method of claim 9 wherein said hub coupling means include peripherally spaced hook elements, the inner ends of said coupling cable being formed with peripherally spaced loops engaging respective hub hook elements.

* * * * *